United States Patent
Kim et al.

(10) Patent No.: US 9,268,051 B2
(45) Date of Patent: Feb. 23, 2016

(54) SYSTEM FOR ACQUIRING CHIRP DATA AND METHOD FOR ACQUIRING CHIRP DATA USING THE SAME

(71) Applicant: Korea Institute of Geoscience and Mineral Resources, Daejeon (KR)

(72) Inventors: Young Jun Kim, Daejeon (KR); Nam Hyung Koo, Daejeon (KR); Snons Cheong, Daejeon (KR); Jong Hwa Chun, Daejeon (KR); Dong Keun Yoo, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 14/340,694

(22) Filed: Jul. 25, 2014

(65) Prior Publication Data
US 2015/0260866 A1    Sep. 17, 2015

(30) Foreign Application Priority Data
Mar. 13, 2014    (KR) ........................ 10-2014-0029352

(51) Int. Cl.
*G01S 15/88*    (2006.01)
*G01S 15/89*    (2006.01)
*G01V 1/38*    (2006.01)

(52) U.S. Cl.
CPC ............... *G01V 1/3808* (2013.01); *G01S 15/88* (2013.01); *G01S 15/89* (2013.01)

(58) Field of Classification Search
CPC ...... G01S 15/88; G01S 13/89; G01S 15/8977
USPC ................................................ 367/15, 87, 88
See application file for complete search history.

(56) References Cited

U.S. PATENT DOCUMENTS 5,815,465 A * 9/1998 Turgut ............................. 367/87
2011/0202278 A1* 8/2011 Caute et al. ..................... 702/14
2012/0263018 A1* 10/2012 Yamaguchi et al. ............ 367/88

FOREIGN PATENT DOCUMENTS

KR    100648917 B1    4/2006

OTHER PUBLICATIONS

Schock, Steven G., "Remote Estimates of Physical and Acoustic Properties in the South China Sea Using Chirp Sonar Data and the Biot Model", IEEE Journal of Oceanic Engineering, vol. 29, No. 4, Oct. 2004.*
Kim et al., "Chirp SBP Data Acquisition SYstem Construction for Raw data and its field Application", Journal of the Korean Society of Mineral and Energy Resources Engineers, Aug. 2013, pp. 441-450, vol. 50, No. 4.*

* cited by examiner

*Primary Examiner* — Ian J Lobo
(74) *Attorney, Agent, or Firm* — The Webb Law Firm (57) ABSTRACT

Provided are a system for acquiring chirp data for profiling the shallow sedimentary layers and a method for acquiring chirp data using the same, and more particularly, a system for acquiring chirp data which includes a new apparatus capable of recording chirp raw data and manufactures a high-resolution raw section preserving polarity and phase information using the recorded chirp raw data to enhance continuity and resolution of the sedimentary layers and a method for acquiring chirp data using the same.

6 Claims, 11 Drawing Sheets

FIG. 1

PRIOR ART

FIG. 2

PRIOR ART

SYSTEM FOR ACQUIRING CHIRP DATA AND METHOD FOR ACQUIRING CHIRP DATA USING THE SAME

CROSS-REFERENCE TO RELATED APPLICATION

This application claims priority to Korean Patent Application No. 10-2014-0029352 filed Mar. 13, 2014, the disclosure of which is incorporated herein by reference in its entirety.

TECHNICAL FIELD

The present invention relates to a system for acquiring chirp data for profiling the shallow sedimentary layers and a method for acquiring chirp data using the same, and more particularly, to a system for acquiring chirp data which includes a new apparatus capable of recording chirp raw data and manufactures a high-resolution raw chirp section preserving polarity and phase information using the recorded chirp raw data to enhance continuity and resolution of the sedimentary layers and a method for acquiring chirp data using the same.

BACKGROUND

Marine seismic exploration is to investigate physical properties of a formation structure, sediments, and rocks of an underground using a hydrophone which records a seismic wave returning by reflecting or refracting the seismic wave, which is artificially generated from a water surface, from a sub-bottom and may be classified into exploration of resources such as petroleum, natural gas, and gas hydrate, which are blessed in the ocean floor and exploration for engineering for marine construction works, such as a submarine pipeline, burial of a submarine cable, a submarine tunnel, a submarine storage facility, and a bridge. The typical marine seismic exploration acquires data by allowing a exploration vessel to tow a seismic source and a hydrophone or equipping the seismic source and the hydrophone in a ship.

The lower the frequency of the seismic source, the better the transmission of the sedimentary layers but the lower the resolution of data becomes, while the higher the frequency of the seismic source, the more the transmission of the sedimentary layers becomes difficult but the higher the resolution of data becomes. Therefore, for the exploration of resources, a large-capacity air gun and a long streamer having a length of several km are used to understand sedimentary layers having a depth of several km. However, the exploration for engineering is to understand the shallow sedimentary layers in a shallow area and therefore a small air gun of high frequency, a sparker, a seismic source generator such as a boomer, and a single channel streamer or a small multi-channel streamer are used.

Figure 1:
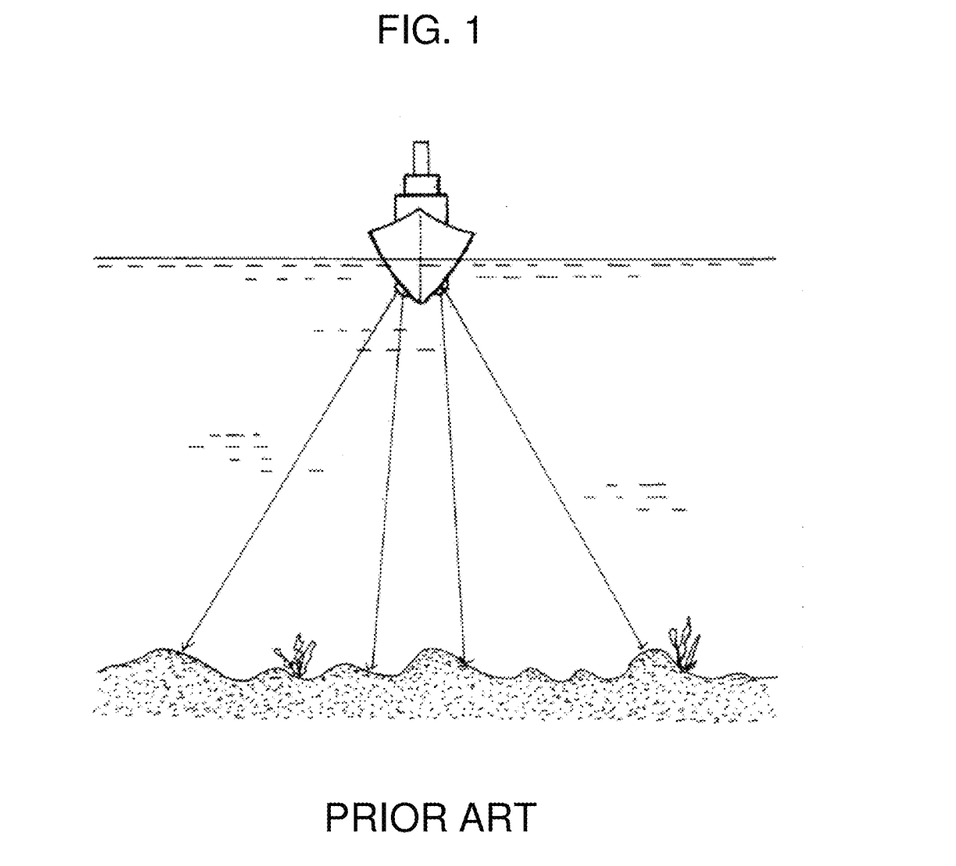
FIG. 1 is a side scan sonar of a ship bottom mounted type according to the related art.

In addition, to understand the submarine topography or the shallow sedimentary layers in the exploration of resources or the exploration for engineering, sub-bottom profiling (SBP) is performed using a multi-beam, a side scan sonar, and a chirp. The multi-beam may confirm the submarine topography in a 3D form and the side scan sonar is to image a sea bed. Further, the chirp profiling may understand the shallow sedimentary layers having several tens of meters from the sea bed. The related technology is disclosed in Korean Patent No. 0648917 (Side Scan Sonar Of Ship Bottom Mounted Type Using Multi Array Transducer And Chirp Signal, Registered Date: Nov. 16, 2006). The Related Art Document is illustrated in FIG. 1 as the invention of the same technical field as the present invention and relates to a side scan sonar of a ship bottom mounted type using a multi array transducer and a chirp signal.

Unlike a system using a boomer, a pinger, and the like, having a single frequency seismic source of a short pulse, the chirp transmits a sweep signal of which the frequency characteristics are changed over time, that is, a frequency modulation (FM) pulse. The general chirp signal is transmitted in a sweep form having a pulse length of 20 to 50 ms and a wideband of 1 to 10 kHz and therefore may obtain sub-bottom data transmitted at a depth of about 100 m while having a high resolution of about 10 cm. A main object of the chirp profiling is to differentiate shallow sediments and a succession of strata and therefore the chip is shown in an envelope form having only positive polarity for easiness of analysis. However, the envelope display method disregards polarity and phase information. If the chirp data preserving the phase information are used, a study on acoustic characteristics using chirp data and various studies on chirp profiling for matching with a core sediment structure, classification of sediments using a reflection coefficient, and the like have been conducted. Therefore, a new profiling apparatus for acquiring chirp data recorded in the existing envelope form and chirp data preserving polarity and phase information has been required.

RELATED ART DOCUMENT

Patent Document

Korean Patent No. 0648917 (Side Scan Sonar Of Ship Bottom Mounted Type Using Multi Array Transducer And Chirp Signal, Registration Date: Nov. 16, 2006)

SUMMARY

An exemplary embodiment of the present invention is directed to providing a system for acquiring chirp data which includes a new apparatus capable of recording chirp raw data and manufactures a chirp raw chirp section preserving polarity and phase information by computing the acquired chirp raw data to more enhance resolution and extend applicability of data and a method for acquiring chirp data using the same.

Another exemplary embodiment of the present invention is directed to providing a system for acquiring chirp data capable of acquiring data preserving polarity and phase information along with data provided in an envelope form by the system for acquiring chirp data according to the related art and synthesizing and analyzing the two data to make accuracy and reliability of data very excellent and a method for acquiring chirp data using the same.

In one general aspect, there is provided a system for acquiring chirp data for profiling the sedimentary layers using a chirp, including: a transducer transmitting a chirp source; a hydrophone receiving a signal returning by reflecting the chirp source transmitted from the transducer from a sub-bottom interface; a first controller including a first transceiver transmitting a trigger pulse to the transducer and receiving the signal received by the hydrophone and a first recorder which receives and computing the received data and records the data in a chirp section having an envelope form and operating the overall profiler; and a second controller including a second transceiver receiving the trigger pulse and the received data from the first transceiver and a second recorder which records the received data in a raw data form.

The second controller may include a computing processor which computes the raw data recorded in the second recorder to differentiate polarity information in color so as to obtain a high-resolution chirp raw section preserving polarity and phase information.

A recording section of a profiling object may be designated to reduce data capacity.

Equal distance shooting may be performed.

In another general aspect, there is provided a method for acquiring chirp data using a system for acquiring chirp data including a transducer, a hydrophone, a first controller, and a second controller, the method including: transmitting, by the transducer, a chirp source; receiving, by the hydrophone, a signal returning by reflecting the chirp source transmitted in the transmitting from a sub-bottom interface and transmitting the received signal to the first controller; transmitting the signal received in the receiving to the second controller and recording the received signal in a chirp section having an envelope form by allowing the first controller to compute the received signal; and recording raw data which are not computed by the second controller.

The method may further include: after the recording of the raw data, computing the raw data recorded in the recording of the raw data to differentiate polarity information by color so as to obtain a high-resolution chirp raw section preserving the polarity and phase information.

The computing may include: correlating between the raw data recorded in the recording of the raw data and a sweep signature of the chirp source; and designing an inverse filter using a Klauder wavelet derived through autocorrelation of the sweep signature and then convoluting the correlated data, thereby obtaining a high-resolution chirp raw section preserving polarity and phase information.

In the computing, at least any one correction or processing method selected from digital filtering processing, gain recovery correction, deconvolution processing, horizontal distance correction, swell effect correction, and migration may be applied.

BRIEF DESCRIPTION OF THE DRAWINGS

FIG. 11B is a diagram illustrating a chirp raw section which is computed by a second controller according to the exemplary embodiment of the present invention.

| [Detailed Description of Main Elements] | |
|---|---|
| 100: Transducer | 200: hydrophone |
| 300: first controller | 310: first transceiver |
| 320: first recorder | 400: second controller |
| 410: second transceiver | 420: second recorder |
| 430: computing processor | |

DETAILED DESCRIPTION OF EMBODIMENTS

Hereinafter, a technical spirit of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

Figure 2:
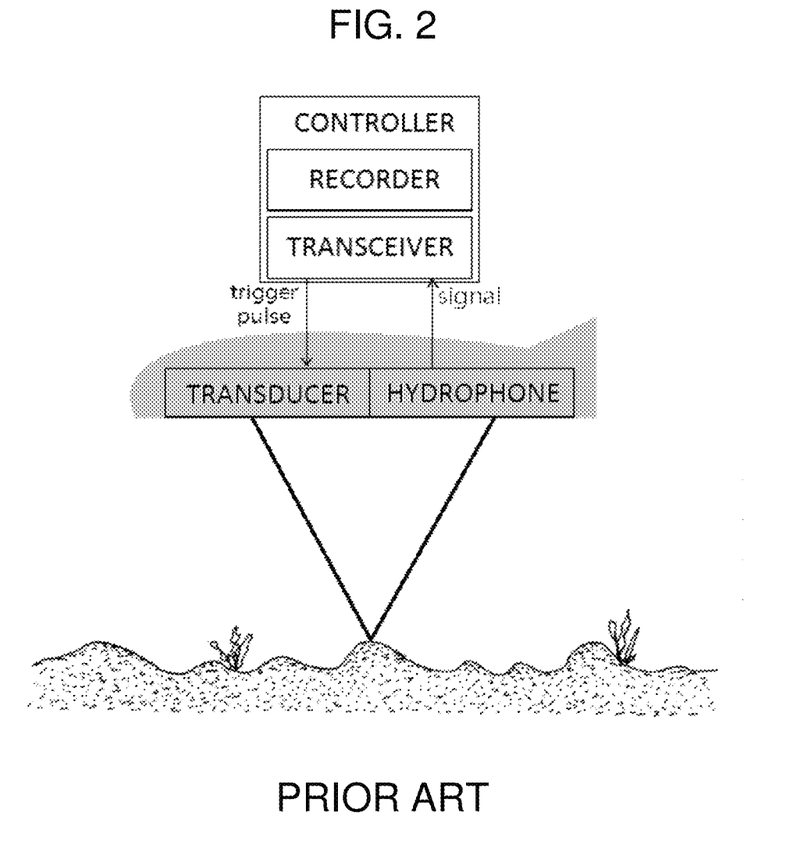
FIG. 2 is a configuration diagram illustrating a system for acquiring chirp data according to the related art.

FIG. 2 illustrates a system for acquiring chirp data according to the related art which includes a transducer, a hydrophone, and a controller. As described above, chirp profiling is to understand the shallow sedimentary layers of high resolution and therefore computes data received for easiness of analysis to provide the data in an envelope form which may be easily analyzed. Herein, the envelope represents instant amplitude and has only a positive number and therefore does not include polarity and phase information. The envelope data has a low frequency band but is represented in a form which may be easily analyzed.

Generally, the higher the depth, the older the sedimentary layers and therefore the density of the sedimentary layers is increased; however, when resources such as gas or petroleum is present in a middle portion of the sedimentary layers, the density of the sedimentary layers is reduced. However, even though the system according to the related art wants to know the sedimentary layers coefficient (reflection coefficient) between interfaces at which the density of the sedimentary layers is changed, the system may not know polarity and phase based on data provided in the envelope form. Therefore, when the profiling is made using the system according to the related art, the system understands the interface at which the density is changed to differentiate a layer but may not understand characteristics on whether the density is increased.

Figure 3:
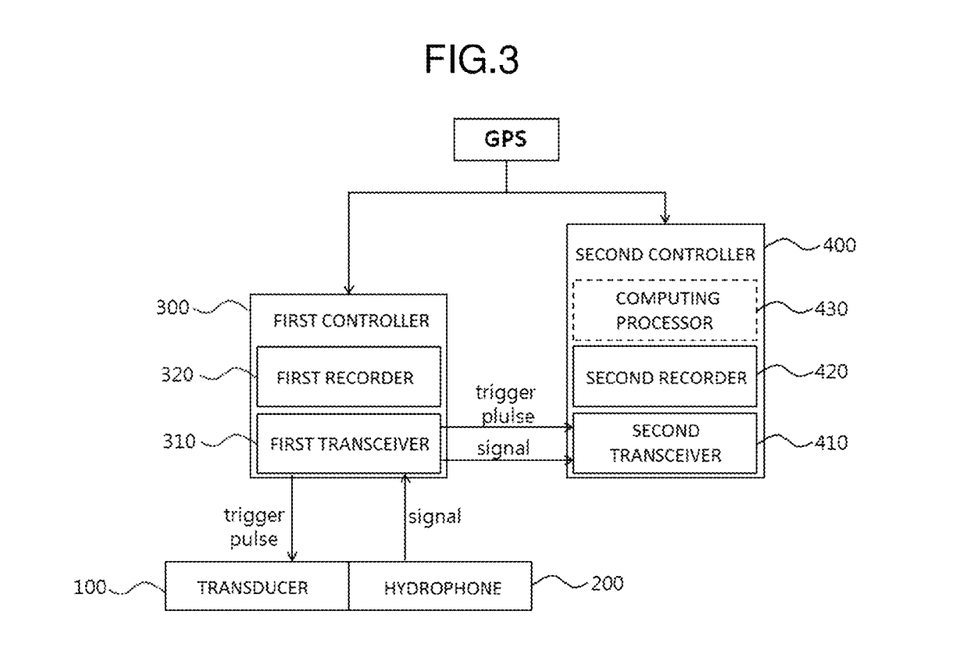
FIG. 3 is a configuration diagram illustrating a system for acquiring chirp data according to an exemplary embodiment of the present invention.

To solve the above problem, a system for profiling the shallow sedimentary layers using a chirp according to the exemplary embodiment of the present invention is configured to include a transducer 100, a hydrophone 200, a first controller 300, and a second controller 400 as illustrated in FIG. 3.

Figure 4A:
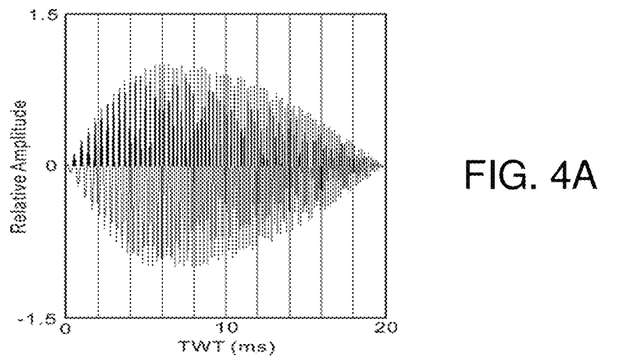
FIG. 4A is an exemplified diagram illustrating a sweep signature.

The transducer 100 transmits a chirp source and the chirp source transmitted from the transducer 100 returns by being reflected from the interface of the sub-bottom and the so reflected signal is received by the hydrophone 200. In this case, the transmitted chirp source is a sweep waveform as illustrated in FIG. 4A. Unlike the profiling data recorded by the chirp source having a short pulse, the precise sweep waveform may control a source ringing phenomenon and improves a signal to noise ration by reducing side-lobes at the time of generating the chirp source. Therefore, the system for profiling the shallow sedimentary layers using a chirp may use the sweep signal as the chirp source to make the transmission depth deep with small energy and constantly keep the resolution regardless of the depth.

The first controller 300 is a computer which operates the system for acquiring chirp data according to the exemplar embodiment of the present invention and finally controls everything associated with the chirp source such as controlling a shot interval, a pulse length, a power, and a gain of the sweep signal which is the chirp source generated from the transducer 100 and monitors and computes the received signal to record the manufactured section. The first controller 300 performing the above function is configured to include a first transceiver 310 transmitting a trigger pulse to the transducer 100 and receiving the signal received by the hydrophone 200 and a first recorder 320 which receives and computes the received data and records the data in a chirp section having the envelope form.

Further, the present invention includes a second controller 400 which is configured to include a second transceiver 410 which receives the trigger pulse and the received data from the first transceiver 310 and a second recorder 420 which records the received data in a raw data form. Further, to receive the same aerial information, a global positioning system (GPS) signal is distributed into the first controller 300 and the second controller 400, respectively to record positional information.

In this case, the second controller 400 may be configured to further include a computing processor 430 which computes the raw data recorded in the second recorder 420 to differentiate polarity information in color so as to obtain the high-resolution chirp raw section preserving polarity and phase information. That is, when the computing processor 430 performs a series of processings using the acquired raw data, the high-resolution chirp raw section preserving the polarity and phase information may be obtained and the reflection coefficient between the interfaces at which the density of the formation is changed may be also understood based on the chirp raw section. In more detail, when the density of the formation is increased, the polarity of the reflection coefficient is positive and to the contrary, when the density of the formation is reduced, the polarity is negative. As such, the difference in the density is represented by a size of the reflection coefficient. Further, for example, when the polarity of the chirp raw section is positive, the polarity information is represented by red, when the polarity thereof is negative, the polarity information is represented by blue, such that the polarity information is differentiated by color, thereby understanding the polarity and phase information of the sedimentary layers at a glance. Therefore, compared with the data in the envelope form provided from the first controller 300, the data which are computed by the second controller 400 include more information and therefore may be used in a study on acoustic characteristics using chirp data and various studies on chirp profiling for matching with a core sediment structure, classification of sediments using a reflection coefficient, and the like. Further, the differentiation of most of the interfaces between the sedimentary layers and continuity of reflection events may be more excellent. However, the interfaces between the sedimentary layers may not be partially differentiated and therefore as the most preferred method of the present invention, it is preferable to synthesizing and analyzing the data in the envelope data provided from the first controller 300 and the data preserving the polarity and phase information manufactured by being computed by the second controller 400. In this way, the accuracy and reliability of the chirp profiling data may be improved.

Further, the system for acquiring chirp data according to the exemplary embodiment of the present invention may designate a recording section of a profiling object to reduce data capacity. The higher the sampling rate, the higher the storage capacity of data. Since the typical system needs to reduce the sampling rate when the depth of water is deep, the resolution may be reduced. However, the present invention may designate the recording section of the profiling object and thus may reduce data throughput without reducing the sampling rate even though the depth of water is deep and obtain the high-resolution data.

Further, the typical system for acquiring chirp data is mainly used on the sea having a shallow water depth and therefore equal time shooting is generally performed. However, the equal time shooting transmitting the chirp source at a predetermined time interval cannot but have reduced accuracy in the acquired data since a speed of a exploration vessel is frequently changed depending on ocean conditions such as wave and wind. Therefore, the system according to the exemplary embodiment of the present invention introduces the equal distance shooting which performs shooting at each predetermined distance using the GPS to perform the precise profiling, thereby increasing the reliability of data.

As described above, a method for acquiring chirp data using the system for acquiring chirp data configured to include the transducer 100, the hydrophone 200, the first controller 300, and the second controller 400 may include transmitting (S100), receiving (S200), recording (S300), and recording raw data (S400).

In the transmitting (S100), the chirp source is transmitted from the transducer 100, and in the receiving (S200), the hydrophone 200 receives the signal returning by reflecting the chirp source transmitted in the transmitting (S100) from the interface between the sedimentary layers and transmits the received signal to the first controller 300. Next, in the recording (S300), the signal received in the receiving (S200) is transmitted to the second controller 400 and is stored in the chirp section having the envelope form by allowing the first controller 300 to compute the received signal. Finally, in the recording of the raw data (S400), the raw data which are not computed by the second controller 400 are stored.

Therefore, after the recording of the raw data (S400), the method for acquiring chirp data may further include computing the raw data recorded in the recording of the raw data (S400) to differentiate the polarity information by color so as to obtain the high-resolution chirp raw section preserving the polarity and phase information.

In this case, the computing (S500) may include correlating between the raw data recorded in the recording of the raw data (S400) and the sweep signature of the chirp source (S510) and designing an inverse filter using a Kluder wavelet derived through autocorrelation of the sweep signature and then convoluting the correlated data (S520), thereby manufacturing the high-resolution chirp raw section preserving the polarity and phase information.

Further, the chirp source of the present invention is a high frequency and therefore the acquired raw data are highly likely to include high frequency noise. In particular, when a succession of sedimentary layer is thin, it is more difficult to differentiate a layer structure due to the noise and therefore there is a need to remove the noise.

Therefore, in the computing (S500) of the present invention, various processings may be performed by increasing the accuracy and resolution of data and facilitating the analysis. For example, at least any one correction or processing method selected from digital filtering processing, gain recovery correction, deconvolution processing, horizontal distance correction, swell effect correction, and migration may be applied.

Figure 4B:
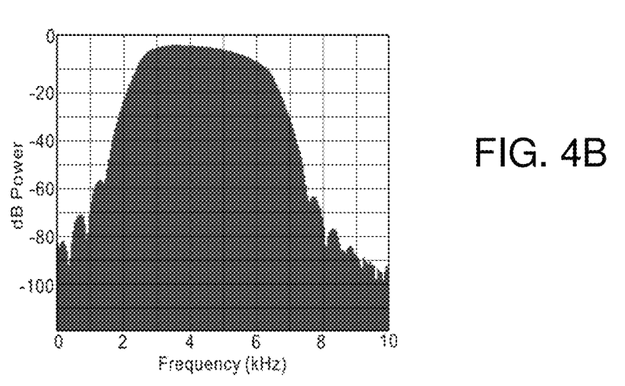
FIG. 4B is a diagram illustrating a result of an amplitude spectrum of FIG. 4A.
Figure 4C:
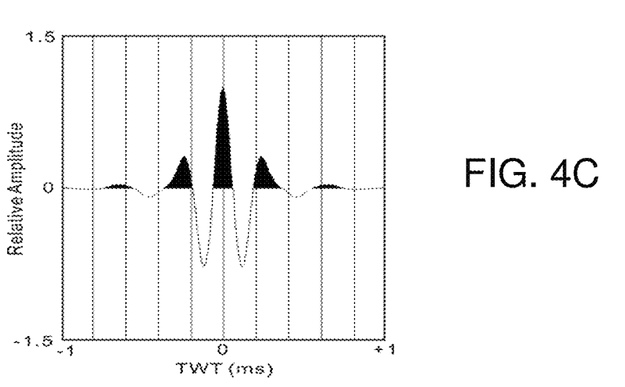
FIG. 4C is a diagram illustrating an autocorrelation result of FIG. 4A.

FIG. 4A illustrates an example of the sweep signature of the sweep signal which is the chirp source of the system for acquiring chirp data of which the bandwidth is 2 to 7 kHz and the pulse length is 20 ms. Further, FIG. 4B illustrates an amplitude spectrum in a frequency domain of FIG. 4A, in which a central frequency of 3.5 kHz and a Gaussian spectrum may be confirmed. Finally, FIG. 4C illustrates the auto-correlation of FIG. 4A, in which the Klauder wavelet of a zero-phase may be confirmed.

Figure 5:
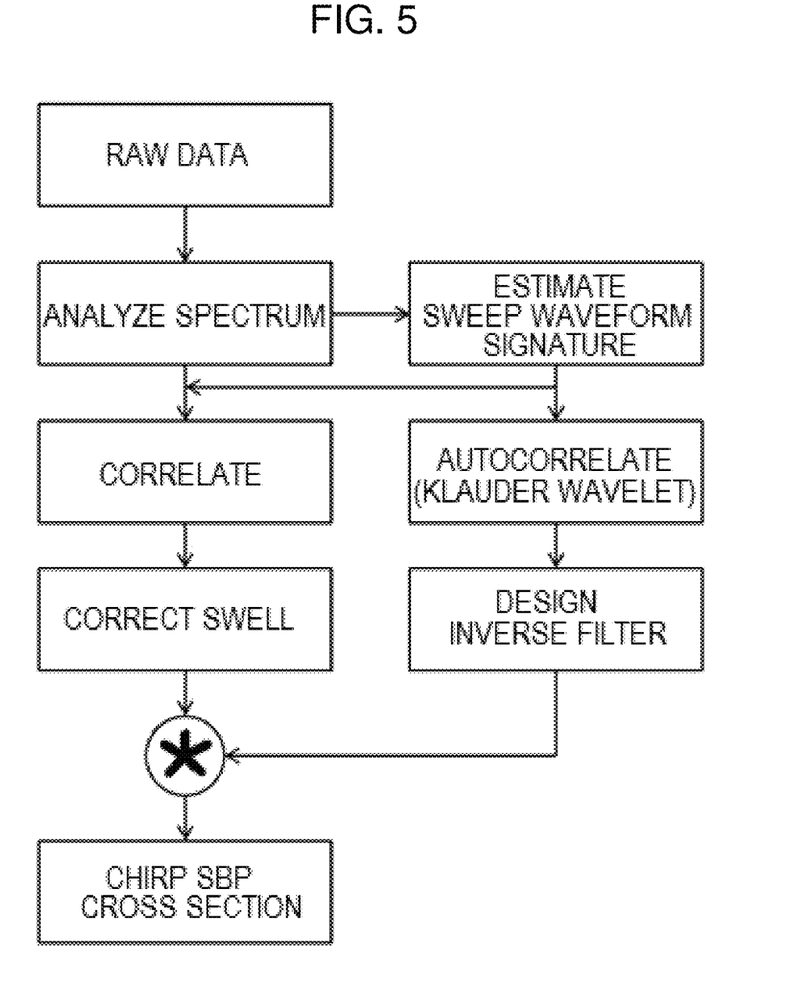
FIG. 5 is a block diagram illustrating a computing process according to the exemplary embodiment of the present invention.
Figure 6:
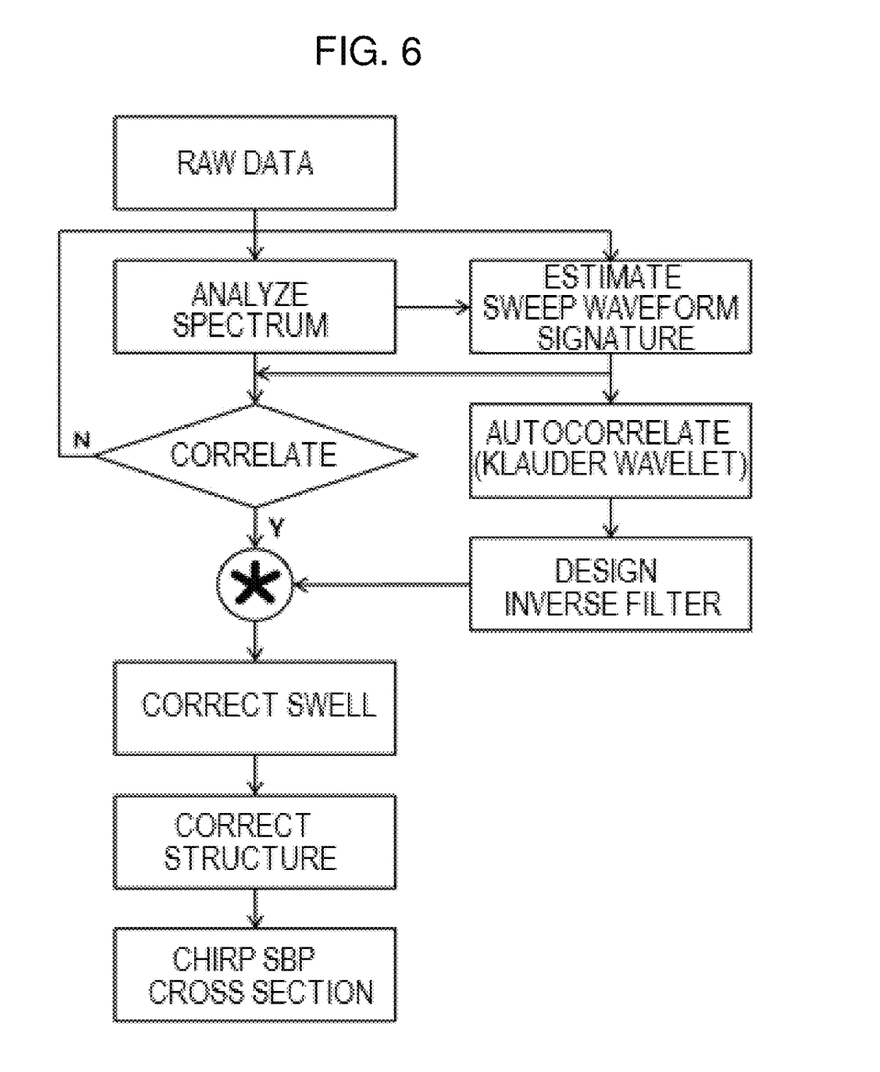
FIG. 6 is a block diagram illustrating a computing process according to another exemplary embodiment of the present invention.

FIGS. 5 and 6 are block diagrams illustrating the computing according to the exemplary embodiments of the present invention.

Hereinafter, describing the exemplary embodiment of the present invention with reference to FIG. 5, the raw data recorded in the second recorder 420 is subjected to the spectrum analysis to estimate the sweep signature of the chirp source. Next, the raw data is correlated between the raw data and the sweep signature and then the correction processing of the swell is performed. Meanwhile, the inverse filter is designed using the Klauder wavelet derived by autocorrelating the sweep signature and then the convolution is performed on the data obtained by correcting the swell effect, thereby obtaining the chirp data preserving the polarity and phase.

Hereinafter, an example of the computing illustrated in FIG. 5 will be described in detail with reference to the drawings (FIGS. 7 to 10) illustrating data acquired in the vicinity of Jeongjahang of Ulsan using the system for acquiring chirp data according to the exemplary embodiment of the present invention.

Figure 7A:
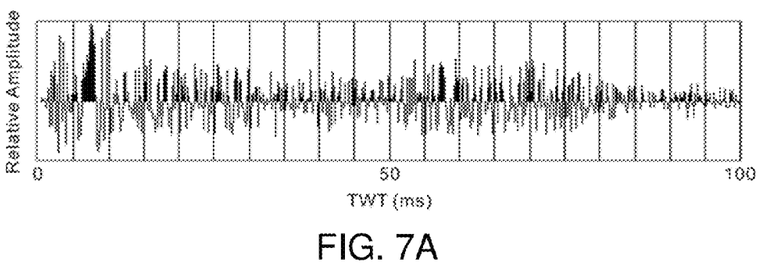
FIG. 7A is a diagram illustrating some of raw data acquired in the vicinity of Jeongjahang of Ulsan.
Figure 7B:
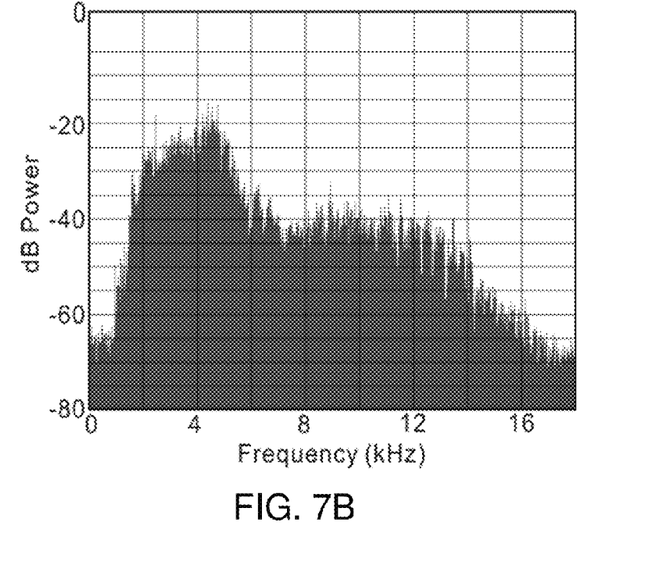
FIG. 7B is a diagram illustrating a result of an amplitude spectrum of FIG. 7A.

First, FIG. 7A illustrates some (up to 100 ms) of the seismic wave recording (raw data) acquired in the vicinity of Jeongjahang of Ulsan recorded in the second recorder 420 and FIG. 7B illustrates an amplitude spectrum of FIG. 7A. By doing so, it may be confirmed that the frequency bandwidth is 2 to 7 kHz and the central frequency is 4.5 kHz.

Meanwhile, the system for acquiring chirp data according to the related art does not publish the sweep signature of the chirp source and provides only some information and therefore the exemplary embodiment of the present invention estimates the sweep signature using the provided information, the frequency analysis (FIG. 5B), and the like.

Figure 8:
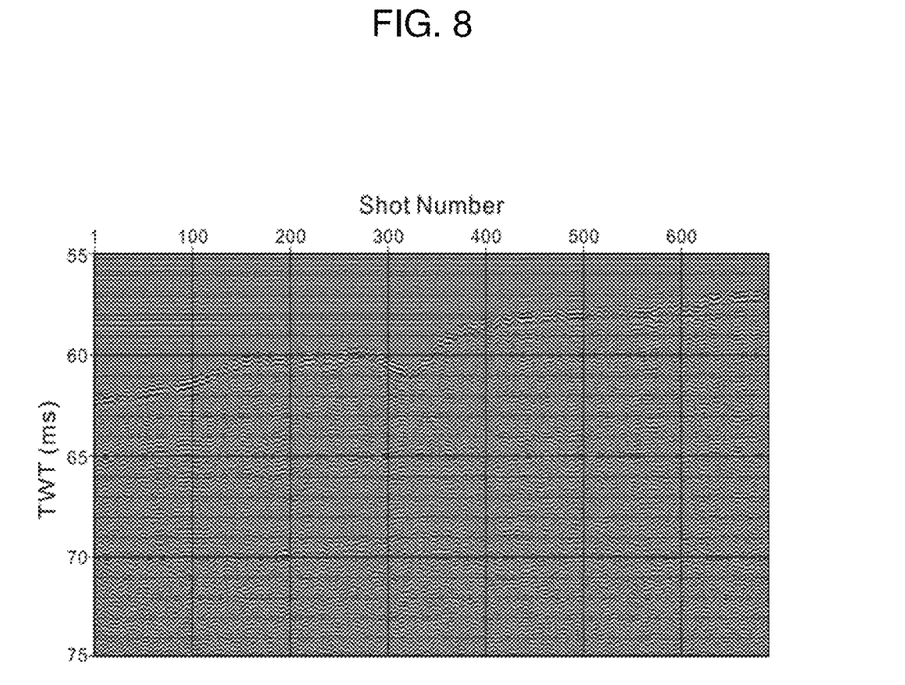
FIG. 8 is a diagram illustrating a correlation result between the sweep signature and the raw data acquired in the vicinity of Jeongjahang of Ulsan.
Figure 9:
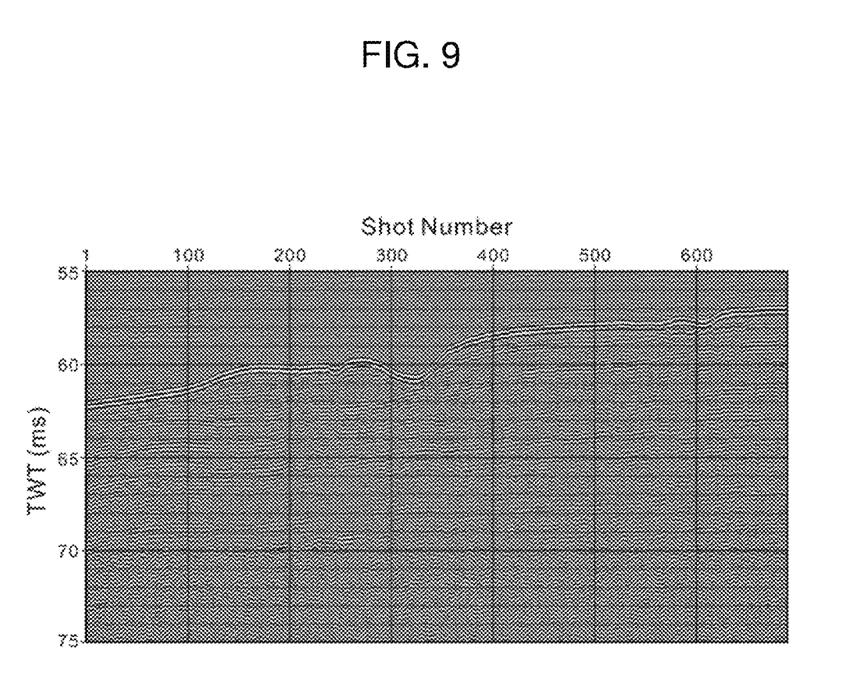
FIG. 9 is a diagram illustrating a correction result of a swell of FIG. 8.

FIG. 8 is data obtained by correlating between the estimated sweep signature and the raw data. Referring to FIG. 8, the chirp data is the high-resolution data having a vertical resolution within about 10 cm and therefore it may be appreciated that the chirp data are considerably affected by wave and swell. Therefore, to correct the swell effect, the exemplary embodiment of the present invention applies a moving average method and the corrected data are illustrated in FIG. 9. In this way, the continuity of the sea bed and the lower sediment layer is improved and the lower sediment layers which are not confirmed prior to the correction of the swell effect may be confirmed. Finally, the result obtained by performing the convolution using the inverse filter designed using the Klauder wavelet derived by the autocorrelation of the weep signature is illustrated in FIG. 10B. As illustrated in FIG. 10B, the final chirp raw section derived according to the exemplary embodiment of the present invention is represented by red when the density of the formation is increased (when polarity is positive) and is represented by blue when the density of the formation is reduced (when polarity is low). By representing the polarity information by different colors, it may be appreciated that the characteristics on whether the density of the formation is increased.

Figure 10A:
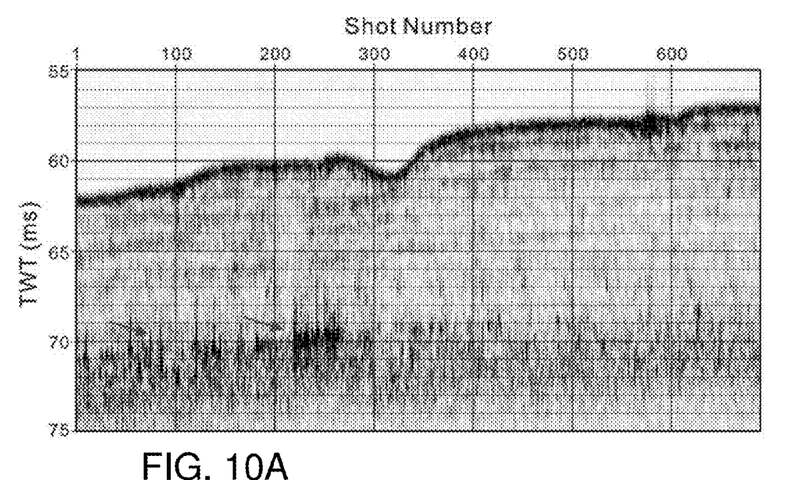
FIG. 10A is a diagram illustrating a section in an envelope form acquired in the vicinity of Jeongjahang of Ulsan provided from the system for acquiring chirp data according to the related art.
Figure 10B:
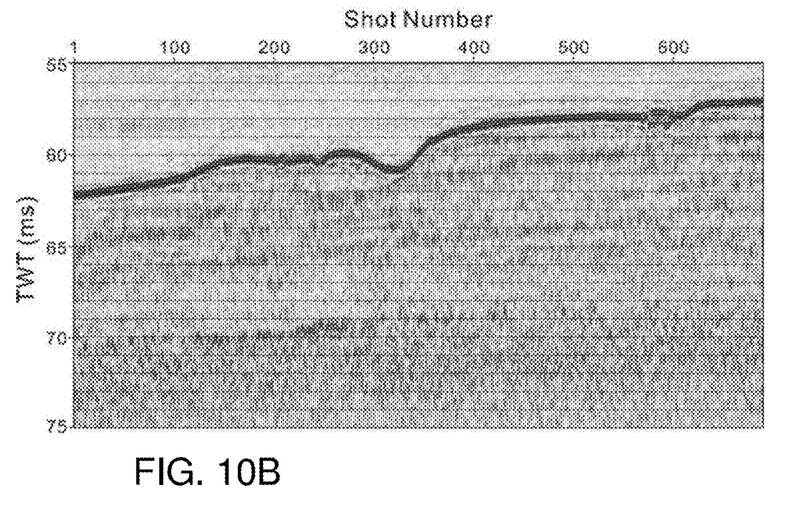
FIG. 10B is a diagram illustrating results obtained by performing convolution using an inverse filter of FIG. 9.

Meanwhile, FIG. 10A illustrates the section in the envelope form provided from the system for acquiring chirp data according to the related art and similar to FIG. 10B, the swell correction is performed by using the moving average method. Comparing FIG. 10A with FIG. 10B, it may be appreciated from FIG. 10A that the sea bed is thicker than other points due to the strong amplitude but a thin layer below the sea bed which is not shown in FIG. 10B is shown.

However, it is confirmed from FIG. 10A that acoustic blanking covering the lower seismic wave signal due to shallow gas at a travel point of 70 m which is represented by an arrow over the whole area is weak. However, in FIG. 10B, the acoustic blanking and a phase reversal phenomenon are expected but are not easily determined based on the data.

Figure 11A:
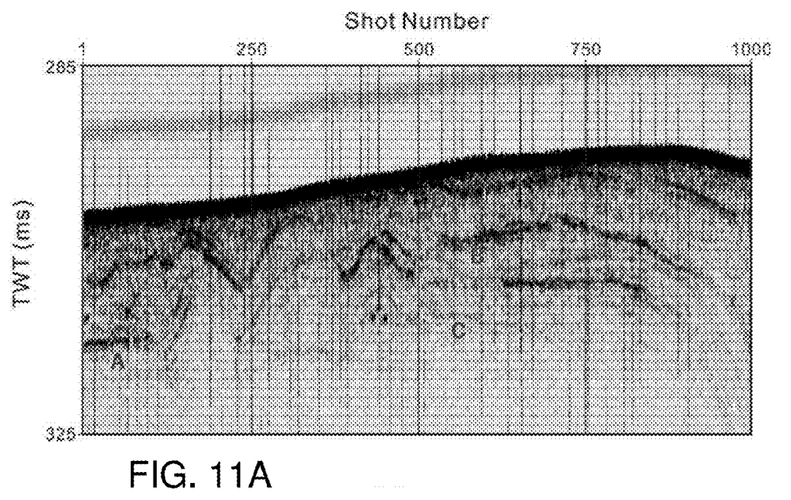
FIG. 11A is a diagram illustrating a section in an envelope form acquired in the vicinity of a continental shelf region, which is away from about 100 km to the east from Ulsan and has a depth of water of about 200 m, provided from the system for acquiring chirp data according to the related art.

Another experimental data are illustrated in FIG. 11 and FIG. 11 is a diagram illustrating a section in an envelope form acquired in the vicinity of a continental shelf region which is away from about 100 km to the east from Ulsan and has a depth of water of about 200 m. FIG. 11A illustrates a section in an envelope form using the system for acquiring chirp data according to the related art and FIG. 11B illustrates a chirp raw section having the polarity and phase which is computed by a second controller. Referring to FIG. 11, it may be appreciated that a width of the sea bed signal of FIG. 11A is relatively wider than that of FIG. 11B. When the sea bed is thick due to the strong amplitude, the information on the sediment layer which is actually present below the sea bed may not be provided. Comparing points A, B, and C at each section of the sea bed, the reflection events which are not clear in FIG. 11A are subjected to digital data processing such as convolution and thus coherent events are stronger in FIG. 11B, thereby confirming that the differentiation of the interface between the sedimentary layers and the continuity of the reflection events are more excellent. However, like point D below the sea bed, the portion at which the continuity of the reflection events is better may be partially confirmed in FIG. 11A which is the envelope section.

Therefore, referring to the two experimental data (FIGS. 7 to 11), as in the present invention, it is preferable to simultaneously acquire and use the data in the envelope form derived from the first controller 300 and the data preserving the polarity and phase information derived from the second controller 400. Therefore, more reliable data may be obtained by synthesizing and analyzing the two data obtained according to the exemplary embodiment of the present invention.

Meanwhile, as illustrated in FIG. 6, those skilled in the art may add or change various computing processes as needed, like increasing the accuracy of data by adding the migration after the swell correction.

Compared to the system according to the relate art which may provide only the data in the envelope form, according to the system for acquiring chirp data according to the exemplary embodiment of the present invention, it is possible to manufacture the high-resolution chirp raw section preserving the polarity and phase information, thereby implementing the study on the acoustic characteristics using the chirp data and various studies on chirp profiling for matching with the core sediment structure, the classification of sediments using the reflection coefficient.

Further, according to the exemplary embodiments of the present invention, it is possible to maximize the accuracy and reliability of the chirp data by synthesizing and analyzing the data in the envelope form provided from the system for acquiring chirp data according to the related art and the data preserving the polarity and phase information.

In addition, according to the method for acquiring chirp data according to the exemplary embodiment of the present invention, it is possible to enhance the resolution of data by appropriately computing the acquired raw data, thereby differentiating the sedimentary layers interface, making the reflection events excellent, and obtaining the high-resolution chirp raw section having a considerable amount of data.

The present invention is not limited to the above-mentioned exemplary embodiments, and may be variously applied, and may be variously modified without departing from the gist of the present invention claimed in the claims.

What is claimed is:

1. A system for acquiring chirp data, the system comprising:
    a transducer transmitting a chirp source;
    a hydrophone receiving a signal returning by reflecting the chirp source transmitted from the transducer from a sub-bottom interface;
    a first controller including a first transceiver transmitting a trigger pulse to the transducer and receiving the signal received by the hydrophone and a first recorder which receives and processes the received data and records the data in a chirp section shown in an envelope form comprising an instant amplitude without polarity and phase information and operating the system; and
    a second controller including a second transceiver receiving the trigger pulse and the received data from the first transceiver and a second recorder which records the received data in a form of unprocessed raw data which includes polarity and phase information,
    wherein the second controller further includes a computing processor which processes the unprocessed raw data recorded in the second recorder to differentiate polarity information in color so as to obtain a high-resolution chirp raw section preserving polarity and phase information.

2. The system of claim 1, wherein a recording section of a profiling object is designated to reduce data capacity.

3. The system of claim 1, wherein equal distance shooting is performed.

4. A method for acquiring chirp data using a system for acquiring chirp data including a transducer, a hydrophone, a first controller, and a second controller, the method comprising:
    transmitting, by the transducer, a chirp source;
    receiving, by the hydrophone, a signal returning by reflecting the chirp source transmitted in the transmitting from a sub-bottom interface and transmitting the received signal to the first controller;
    recording, with a first recorder, the received signal in a chirp section shown in an envelope form comprising an instant amplitude without polarity and phase information by allowing the first controller to process the received signal;
    transmitting the received signal to the second controller;
    recording, with a second recorder, unprocessed raw data, which includes polarity and phase information; and
    processing, with the second controller, the raw data, which includes polarity and phase information, recorded in the recording of the raw data to differentiate polarity information by color so as to obtain a high-resolution chirp raw section preserving the polarity and phase information.

5. The method of claim 4, wherein the processing includes:
    correlating between the raw data recorded in the recording of the raw data and a sweep signature of the chirp source; and
    designing an inverse filter using a Klauder wavelet derived through autocorrelation of the sweep signature and then convoluting the correlated data.

6. The method of 4, wherein in the processing, at least any one correction or processing method selected from digital filtering processing, gain recovery correction, deconvolution processing, horizontal distance correction, swell effect correction, and migration is applied.

* * * * *

UNITED STATES PATENT AND TRADEMARK OFFICE
CERTIFICATE OF CORRECTION

| | | |
|---|---|---|
| PATENT NO. | : 9,268,051 B2 | Page 1 of 1 |
| APPLICATION NO. | : 14/340694 | |
| DATED | : February 23, 2016 | |
| INVENTOR(S) | : Young Jun Kim et al. | |

It is certified that error appears in the above-identified patent and that said Letters Patent is hereby corrected as shown below:

In the claims,
Column 10, Line 37, Claim 6, after "of" insert -- claim --

Signed and Sealed this
Seventh Day of June, 2016

Michelle K. Lee
*Director of the United States Patent and Trademark Office*